United States Patent
Hondo et al.

(10) Patent No.: US 7,304,982 B2
(45) Date of Patent: Dec. 4, 2007

(54) METHOD AND SYSTEM FOR MESSAGE ROUTING BASED ON PRIVACY POLICIES

(75) Inventors: Maryann Hondo, Arlington, MA (US); Anthony Joseph Nadalin, Austin, TX (US); Ajamu Akinwunmi Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 10/334,474

(22) Filed: Dec. 31, 2002

(65) Prior Publication Data

US 2004/0125798 A1 Jul. 1, 2004

(51) Int. Cl.
*H04L 12/28* (2006.01)
*H04L 12/56* (2006.01)
*G06F 17/00* (2006.01)

(52) U.S. Cl. .................... 370/351; 370/389; 370/401; 709/201; 726/1

(58) Field of Classification Search ............... 370/352, 370/400–401; 726/1–4, 11–14; 709/201–203, 709/227–228
See application file for complete search history.

(56) References Cited

U.S. PATENT DOCUMENTS 5,926,798 A * 7/1999 Carter .................... 705/26
7,069,427 B2 * 6/2006 Adler et al. .................... 713/1
7,076,558 B1 * 7/2006 Dunn ........................ 709/229
2003/0097383 A1 * 5/2003 Smirnov et al. ............ 707/204
2004/0083243 A1 * 4/2004 Feng et al. .................. 707/203

* cited by examiner

*Primary Examiner*—Chi Pham
*Assistant Examiner*—Tri H. Phan
(74) *Attorney, Agent, or Firm*—Jeffrey S. LaBaw (57) ABSTRACT

A method, system, apparatus, or computer program product is presented for routing event messages between data processing systems based on privacy policies associated with the data processing systems and based on event policies associated with event types for the event messages. When a system attempts to publish an event message for a particular type of event or to subscribe to those event messages, an event policy is checked to determine whether the system may publish messages for that type of event or may subscribe to those messages. Moreover, if a publishing system publishes an event message that contains personally identifiable information for a user of a data processing system, and a subscribing system has subscribed to event messages having the same event type, then the privacy policies associated with the systems are compared to determine compatibility or incompatibility between the privacy policies before routing a message between the systems.

27 Claims, 4 Drawing Sheets

*FIG. 5*

METHOD AND SYSTEM FOR MESSAGE ROUTING BASED ON PRIVACY POLICIES

BACKGROUND OF THE INVENTION

1. Field of the Invention

The present invention relates to an improved data processing system and, in particular, to a method and apparatus for information processing. Still more particularly, the present invention relates to privacy constraints on information processing.

2. Description of Related Art

The Internet has greatly facilitated the exchange of information for many purposes. Many applications now incorporate Internet-related standards, thereby enabling enterprises to collaborate over the Internet while maintaining private networks. As Internet-connected applications have become more sophisticated and as enterprises have become more knowledgeable about the business advantages that can be realized by cooperating across the Internet, enterprises have shown a desire to increase the level of collaboration, particularly through web services that incorporate newly developed standards.

Web services are self-contained, self-describing, modular applications that can be published, located, and invoked across the World Wide Web. Web services can perform a variety of simple functions or complicated business processes. Once a web service is deployed, other applications, including other web services, can discover and invoke the deployed service.

As with any other type of application, web services often require personally identifiable information (PII) in order to perform a transaction for a particular user, which may be as simple as an online purchase. Privacy laws require that some organizations allow users to control the personally identifiable information that is released and to whom it is released. Typical user attributes, such as a user's name, are included in the category of personally identifiable information, yet many computing environments have not included any means for user control over the release of user attributes. The demand for more privacy laws has increased as users have become more aware of the ways in which their private information can be abused.

While web services incorporate a standardized framework that allows enterprises to collaborate, it may not be possible for some enterprises to collaborate on certain transactions without sharing some of the personally identifiable information of their users. Collaboration between enterprises across the Internet is generally beneficial to enterprises and users, but users are demanding online privacy controls to maintain the confidentiality of personally identifiable information. Hence, enterprises need mechanisms to ensure that their collaborative partners will also maintain the confidentiality of their users' personally identifiable information. In other words, an enterprise needs a mechanism to ensure that any personally identifiable information of its users that it shares with a collaborative partner through a Web service will not be abused.

Although a web service framework does not necessarily require asynchronous messaging, enterprises are increasingly implementing web service architectures that incorporate an asynchronous event-based message routing infrastructure. In such environments, personally identifiable information would be shared among collaborative enterprises in a web service environment within the messages of the messaging infrastructure.

Therefore, in order to maintain the confidentiality of personally identifiable information that is associated with users of web services, it would be advantageous to provide privacy controls on the routing of messages that might contain personally identifiable information within the message routing infrastructure that is incorporated into those web services.

SUMMARY OF THE INVENTION

A method, system, apparatus, or computer program product is presented for routing event messages between data processing systems based on privacy policies associated with the data processing systems and based on event policies associated with event types for the event messages. When a system attempts to publish an event message for a particular type of event or to subscribe to those event messages, an event policy is checked to determine whether the system may publish messages for that type of event or may subscribe to those messages. Moreover, if a publishing system publishes an event message that contains personally identifiable information for a user of a data processing system, and a subscribing system has subscribed to event messages having the same event type, then the privacy policies associated with the systems are compared to determine compatibility or incompatibility between the privacy policies before routing a message between the systems.

BRIEF DESCRIPTION OF THE DRAWINGS

The novel features characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
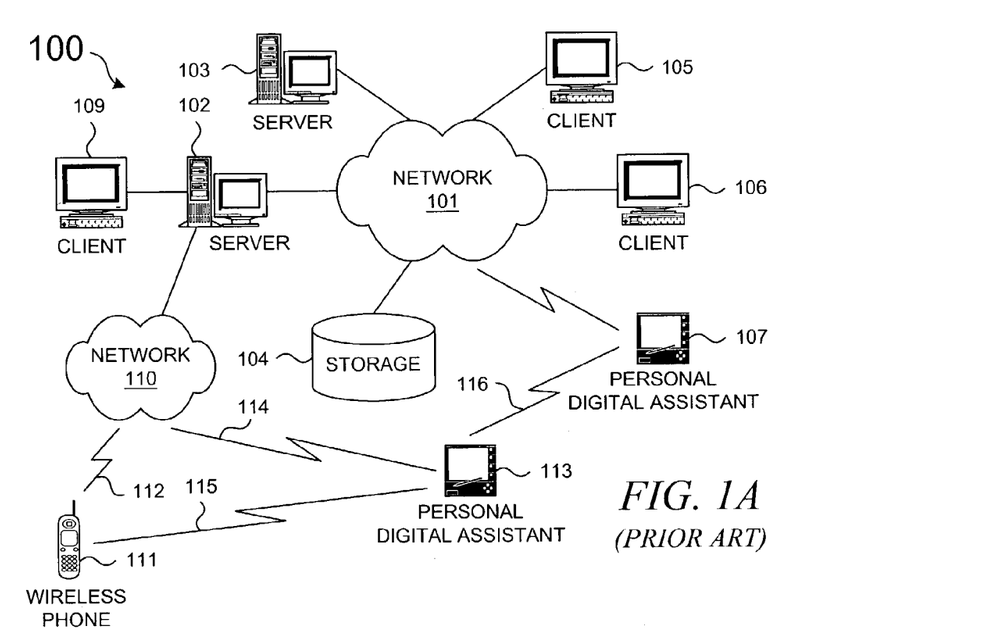
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
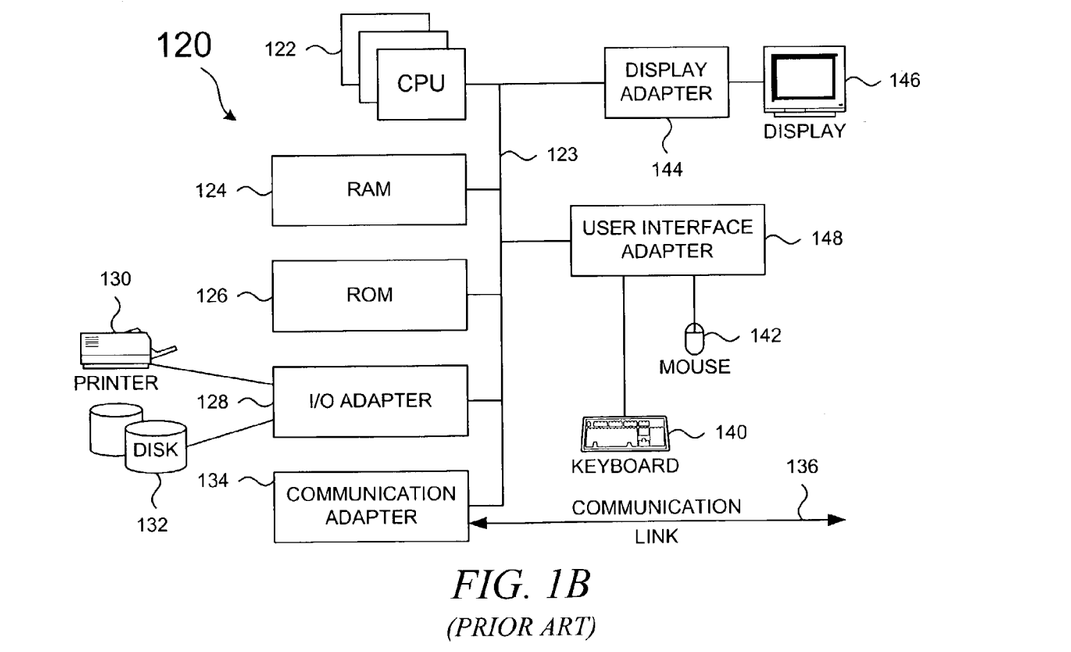
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to implementing privacy policy considerations on the routing of messages that are used to exchange information within a web service architecture, particularly personally identifiable information of users of web services, as described in more detail below with respect to the remaining figures.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Similarly, the descriptions of the figures herein refer to actions by publishers and subscribers. A publisher or a subscriber may be a user (or an object that is used by said user), a user group (or an object or set of objects that are used by said user group), an application, a system, a server, a network, a service domain, or some other type of module, component, or entity that performs publication and subscription operations within a data processing system.

Figure 2:
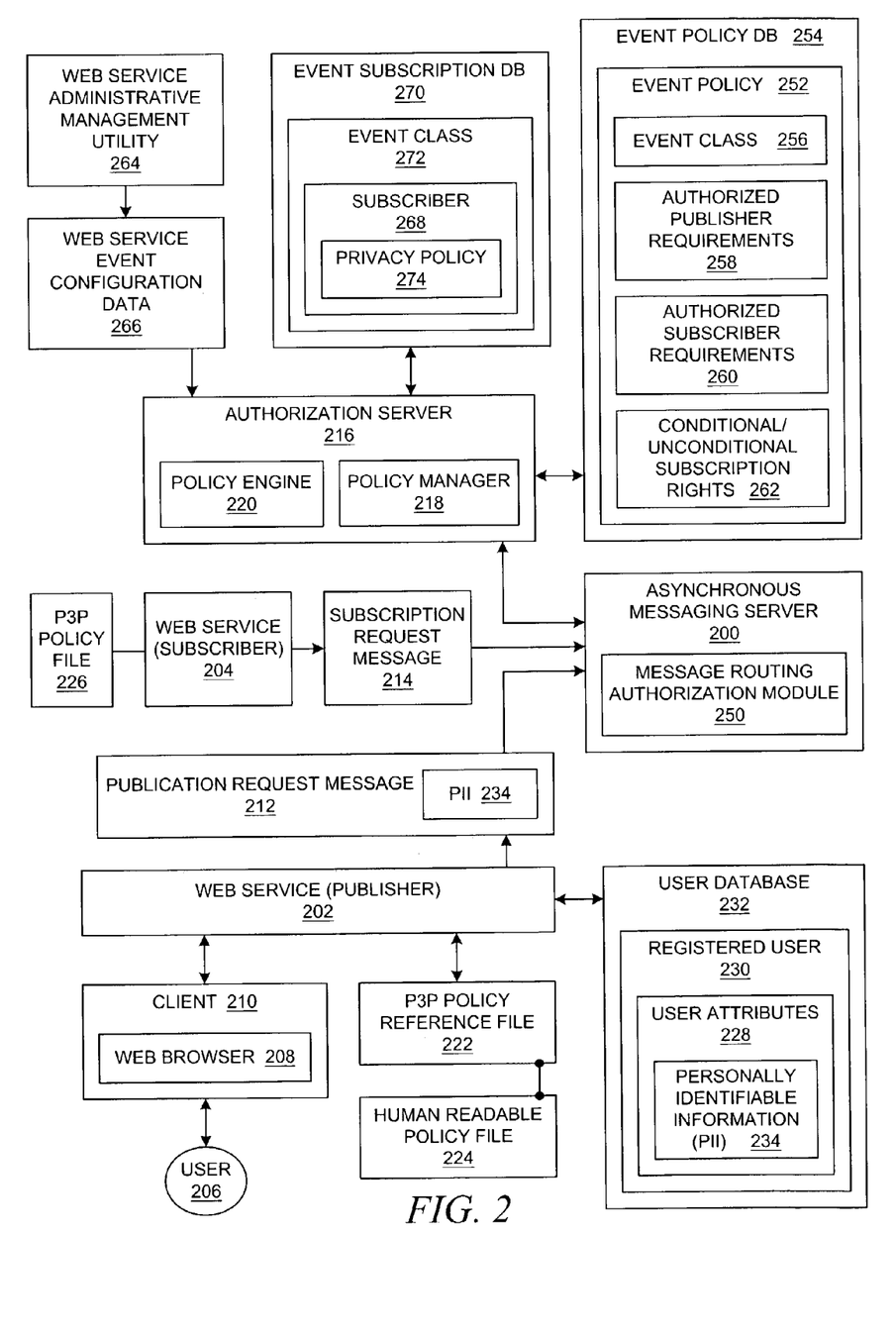
FIG. 2 depicts a block diagram that shows a set of components that may be used within an asynchronous messaging system that employs privacy policies in accordance with the present invention.

With reference now to FIG. 2, a block diagram depicts a set of components that may be used within an asynchronous messaging system that employs privacy policies in accordance with the present invention. In a manner similar to prior art systems, asynchronous messaging server 200 interoperates with many web services, such as web service 202 and web service 204. These entities may operate within a distributed data processing environment, such as the networked environment described with respect to FIG. 1A. Web service 202 provides one or more services for user 206, which accesses web service 202 via browser application 208 through client device 210; user 206 may employ other types of applications, such as an application that incorporates a SOAP (Simple Object Access Protocol) client.

Both web service 204 and web service 206 may act as a publisher and/or a subscriber of event-based messages; in this example, web service 202 sends publication request message 212 to asynchronous message server 200, thereby acting as a publisher, while web service 204 sends subscription request message 214 to asynchronous message server 200, thereby acting as a subscriber. Web service 204 and web service 206 may operate through the use of well-known specifications, such as HTTP, XML, SOAP, UDDI (Universal Description, Discovery, and Integration), WSDL (Web Service Definition Language), and other specifications. It should be noted that although the asynchronous messaging system of the present invention may be configured to interoperate with web services, the present invention may be integrated with other types of data processing systems without affecting the scope of the present invention. In addition, asynchronous message server 200 may represent only a portion of an asynchronous messaging infrastructure, which may support messages that are formatted in accordance with a variety of specifications.

Asynchronous message server 200 primarily handles subscription request messages and publication request messages in a manner that is somewhat similar to what is known in the prior art. Subscription requests are registered, and publication requests trigger event messages to those entities that have previously registered to receive particular types of events. More specifically, when asynchronous message server 200 receives a subscription request for a particular event type, the subscribing entity is registered in some manner. When asynchronous message server 200 receives a publication request message from a publishing entity that notifies asynchronous message server 200 of the occurrence of an event with an associated event type that corresponds to the event type in the previous subscription request, asynchronous message server 200 sends a publication event message to the subscribing entity. A publication event message may be substantially similar to or identical to a publication request message; in some implementations, asynchronous message server 200 copies the content payload from a publication request message to multiple copies of a publication event message. Asynchronous message server 200 supports multiple publishers, multiple subscribers, and multiple event types.

In a manner somewhat similar to other prior art systems, authorization server 216 may be present within the web services environment to support authorization operations with respect to web service operations. Authorization server 216 supports policy manager 218 that creates, deletes, modifies, or otherwise manages policies that may be stored in a variety of databases. Authorization server 216 also supports policy engine 220 that evaluates a policy in accordance with input parameters from entities that request an authorization operation.

Moreover, web service 202 and web service 204 may also operate in a manner that is somewhat similar to other prior art systems. For example, web service 202 publishes (or otherwise makes publicly available) its privacy policy, which is shown in the example as P3P (Platform for Privacy Preferences) policy reference file 222, which is linked to human readable policy file 224; web service 204 likewise provides P3P policy reference file 226. Web service 202 securely stores user attributes 228 about each of its registered users 230 in user database 232 or some other appropriate type of database. Each set of user attributes may be assumed to contain personally identifiable information 234, i.e. attribute information about a user that is personal to the user and may be confidential. In some instances, web service 202 requires a service provided by web service 204, which may require some amount of personally identifiable information to perform a particular transaction for a particular user. Web service 202 sends personally identifiable information 234 through publication request message 212, which is eventually forwarded to a particular web service 204.

In contrast to prior art systems, however, asynchronous message server 200 incorporates message routing authorization module 250, which applies policy considerations to the message handling and message routing operations of asynchronous message server 200. Event policies 252 can be stored in event policy database 254 or some other appropriate type of database; event policy database 254 can be managed by policy manager 218. Event policies may be formatted in accordance with any appropriate specification.

For each defined event class/type that is supported by the asynchronous messaging infrastructure, event policy 252 is associated with event class 256. Event policies limit the entities that may publish events or subscribe to events of a given event class. Attributes 258 (or similar required indications) of entities that are authorized to become publishers of instances of events for event type 256 are stored within event policy 252. Similarly, attributes 260 of entities that are authorized to become subscribers to instances of events for event type 256 are stored within event policy 252. The use of these attributes are explained in more detail further below.

An event type can be further categorized in accordance with whether or not events for the event type are associated with processing of personally identifiable information for a user of a web service; if so, then the event type is indicated as having conditional subscription rights, and if not, the event type is indicated as having unconditional subscription rights. Indicator 262 of the subscription rights for event type 256 is stored within event policy 252. With unconditional subscription rights, a subscriber's privacy policy is not examined prior to sending the subscriber a publication event message; with conditional subscription rights, a subscriber's privacy policy is examined prior to sending the subscriber a publication event message, as explained in more detail further below.

Event policies may be configured through a variety of means. For example, an administrative user may use web service administrative management utility 264 to create web service configuration (install and setup) data 266, which may contain one or more event policies associated with one or more web service events that are recognized by systems within a web service environment. In a preferred embodiment, event policies are associated with the description of the event deployment.

After entities have subscribed to a particular class of events, information about subscribing entities 268, e.g., an identifier for a system, service, or domain, is stored within event subscription database 270 in association with indicator 272 of the subscribed event class/type. In addition, during the subscription process, a requesting entity's privacy policy is obtained, received, or retrieved in some manner; for example, it may have been received along with the subscription request, or it may have been retrieved from an appropriate database. Privacy policy 226 for subscriber 268 may be cached or stored in event subscription database 270 as cached privacy policy 274. For example, after subscription request 214 is processed by asynchronous messaging server 200, privacy policy 274 for web service 264 may be identical to P3P policy file 226; alternatively, a web service's privacy policy that is associated with an event class may originate from some other source. Alternatively, the privacy policies may be formatted in accordance with any appropriate specification. The use of a subscriber's privacy policy is described in more detail further below.

Figure 3:
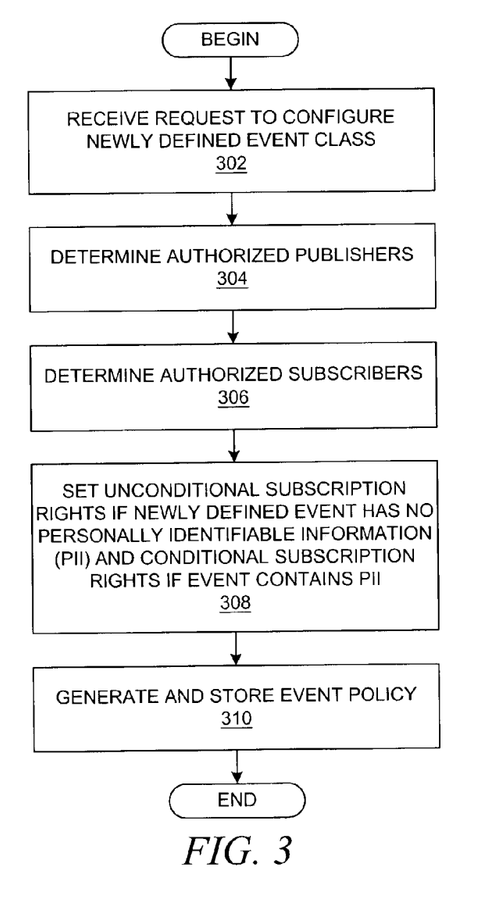
FIG. 3 depicts a flowchart that shows a process for configuring an event within an asynchronous messaging system that employs privacy policies in accordance with the present invention.

With reference now to FIG. 3, a flowchart depicts a process for configuring an event within an asynchronous messaging system that employs privacy policies in accordance with the present invention. Configuring events within a set of systems may be performed through a variety of means and may include out-of-band processes. The process that is shown in FIG. 3 may be considered to be a portion of a larger configuration process in which knowledge about a newly defined type of event is disseminated among many systems; more specifically, the process that is shown in FIG. 3 configures any event policies that might be associated with newly defined types of events such that messages that are associated with these types of events can be subsequently routed in accordance with the event policies. In addition, the process that is shown in FIG. 3 may be performed by the asynchronous messaging system, by an authorization system, or some combination of the two systems.

The process begins when a configuration request is received to configure an event within the asynchronous messaging subsystem (step 302). If the set of publishers and subscribers is not restricted for the event type that is being configured, then an event policy does not need to be configured for the event type; alternatively, some form of non-existent or null event policy may be configured that results in the authorization of any requester to publish or subscribe to events for the event type that is being configured. While the system may optionally support event types that do not require authorization of publishers and subscribers, it is assumed that many event types restrict publication and subscription operations to only authorized publishers and subscribers. Hence, a determination is made as to the publishers that are authorized to publish messages with the corresponding event type that is being configured (step 304). Similarly, a determination is made as to the subscribers that are authorized to subscribe to messages with the corresponding event type that is being configured (step 306). A publisher or a subscriber is represented by an appropriate identifier; the publishers and subscribers may be extracted from the configuration request, or a set of publishers and subscribers may be obtained from a datastore in which such information has been previously configured.

After determining a set of authorized publishers and subscribers, subscription rights are set based on whether or not a message for the event type that is being configured will contain personally identifiable information (step 308). If so, then conditional subscription rights are set for the event type that is being configured; in this case, the routing of messages for this event type are considered on a message-by-message basis in view of the privacy policies of the parties that are involved. If a message for the event type that is being configured will not contain personally identifiable information, then unconditional subscription rights are set for the event type that is being configured; in this case, a subscriber to events corresponding to the event type receives copies of all event messages that are published to the message routing system for the event type without any consideration of the subscriber's privacy policy. In this manner, rather than reviewing a subscriber's policy for each publication request message, the system may quickly and efficiently route messages that do not have any associated privacy considerations. Step 308 may be considered to be an optional step that improves the efficiency of the message routing processes. In any case, a new event policy is generated and stored in association with an indicator of the event type that is being configured (step 310), and the process is complete.

Figure 4:
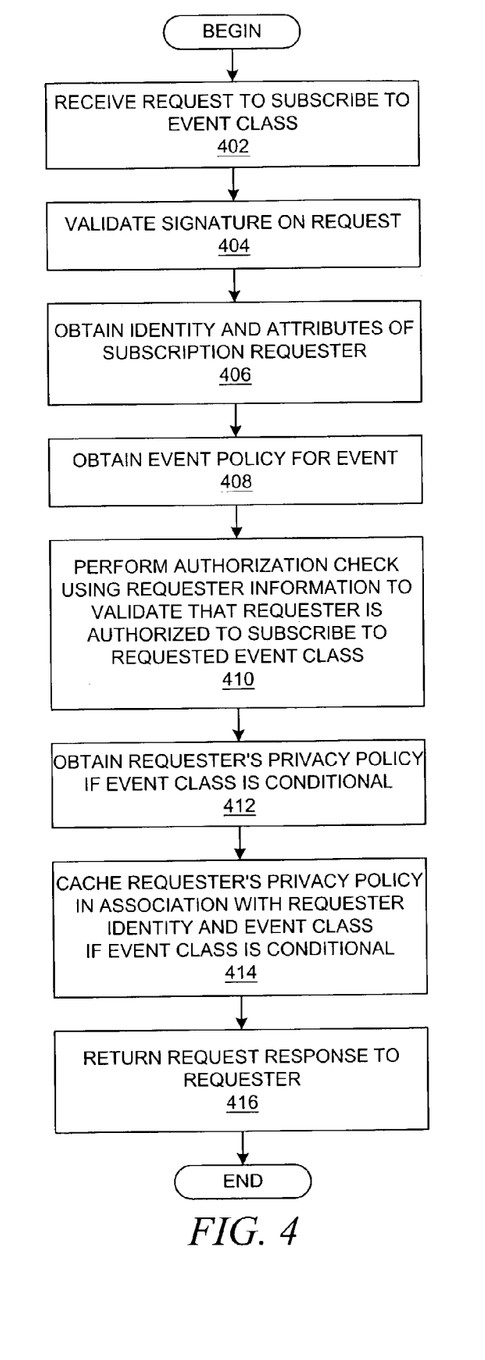
FIG. 4 depicts a flowchart that shows a process for subscribing to an event within an asynchronous messaging system that employs privacy policies in accordance with the present invention.

With reference now to FIG. 4, a flowchart depicts a process for subscribing to an event within an asynchronous messaging system that employs privacy policies in accordance with the present invention. The process that is shown in FIG. 4 allows entities to subscribe to events or event messages that are associated with an event type that has been previously configured within the system, e.g., through the process that is illustrated in FIG. 3.

The process begins with a receipt of a subscription request message to subscribe to an event class, i.e. any instances of events (or publication event messages) of a particular event type/class (step 402), after which the digital signature on the subscription request message is validated if necessary (step 404). The policy would state if a digital signature was needed as this may be a trusted link and no signature is needed. If the digital signature cannot be validated, then the subscription request message may be discarded or some type of error response may be returned. The digital signature validation process ensures that only trusted entities, i.e. only entities with verifiable identities, can subscribe to any messages that are handled by the asynchronous message processing system.

Assuming that the digital signature on the subscription request message has been validated, the process continues by obtaining the identity of the subscription requester (step 406), possibly through an identity mapping process, possibly along with any attributes that are associated with the requester if necessary; in other words, various information about the requester, including its identity, may be used for any subsequent processing. The subscription request message indicates a particular event type to which the requester desires to subscribe; this indication is used to obtain an event policy for the event type (step 408), which was previously configured using a process such as the one described with respect to FIG. 3. An authorization operation is then performed (or requested from an authorization server/subsystem/system) for the subscription request using the event policy based on the requester's identity and/or other information associated with the requester (step 410) in order to determine whether the requester is authorized to subscribe as requested. If the authorization process fails, then a response message that indicates the failure may be returned to the requesting entity.

Figure 5:
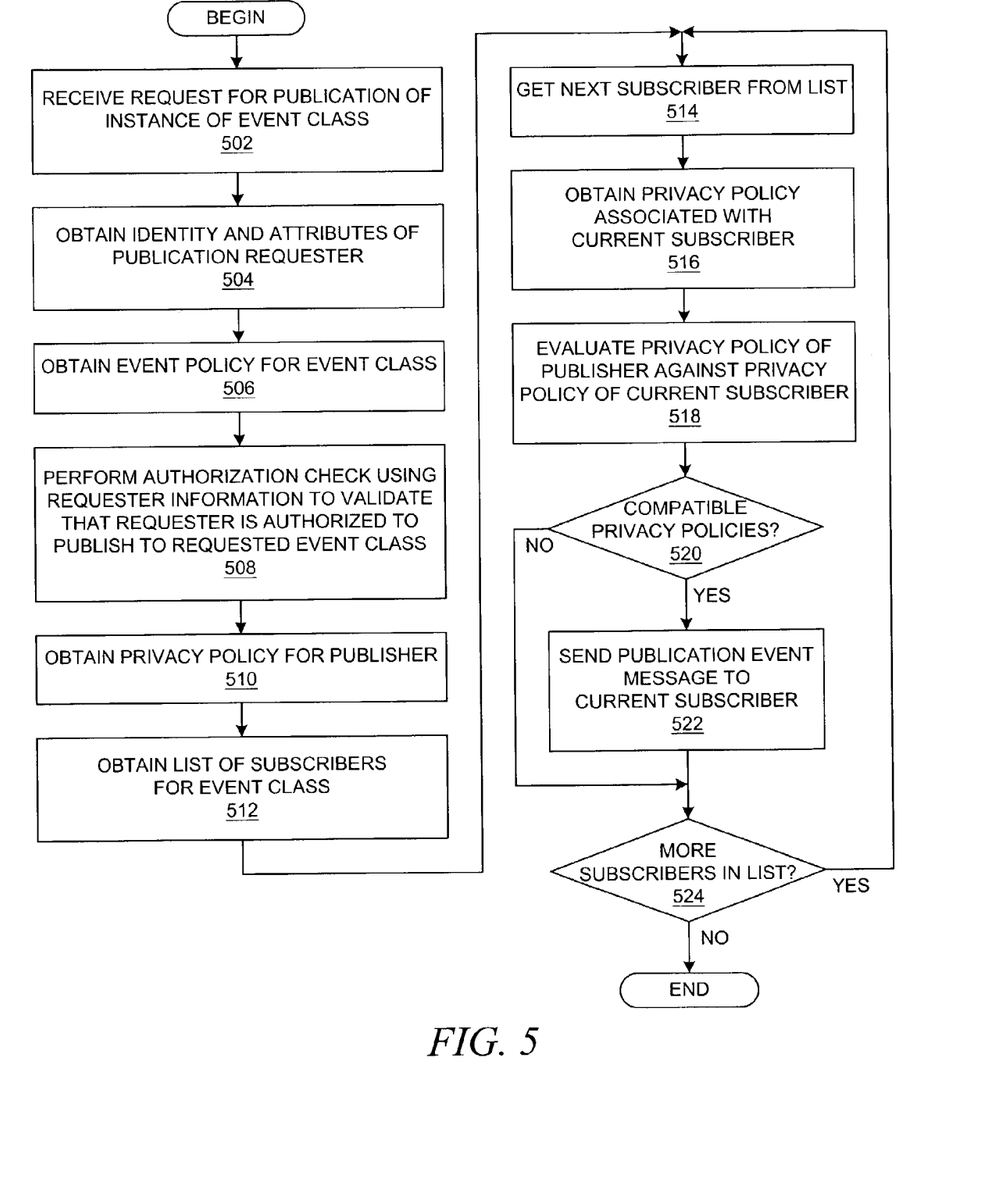
FIG. 5 depicts a flowchart that shows a process for publishing an event within an asynchronous messaging system that employs privacy policies in accordance with the present invention.

Assuming that the requester has passed the authorization check, then the requester is allowed to become a subscriber to events of the requested event type. The requester's privacy policy is obtained (step 412), which may have been received along with the subscription request or may be retrieved from an appropriate database. The requester's privacy policy is then cached or stored in an appropriate database along with other subscribers to the event type (step 414); the privacy policy is stored in association with an identifier for the requester and an identifier for the event type such that the identifier and the event type can be subsequently used to retrieve the stored privacy policy, e.g., during the process that is shown in FIG. 5. If the asynchronous messaging system supports a distinction between conditional and unconditional subscription rights as described above, then in an alternative embodiment of the present invention, the requester's privacy policy is only cached if the event type has conditional subscription rights. In other words, steps 412 and 414 may not be performed if the event type has unconditional subscription rights. In any case, a response message for the request is returned to the requester (step 416), and the process is complete.

With reference now to FIG. 5, a flowchart depicts a process for publishing an event within an asynchronous messaging system that employs privacy policies in accordance with the present invention. The process that is shown in FIG. 5 processes requests to publish events that are associated with an event type that has been previously configured within the system, e.g., through the process that is illustrated in FIG. 3. In addition, at least one entity within the asynchronous messaging system would usually already have subscribed to events of a particular event type prior to the publication of an event of that event type; however, this is not necessarily always true. However, FIG. 5 assumes that at least one entity has previously subscribed to events of a particular event type prior to the publication of an event message for that particular event type.

The process begins with a receipt of a publication request message to publish an event that belongs to a particular event class, i.e. an event instance (to be represented by a publication event message) of a particular event type/class (step 502). Optionally, a digital signature can be placed on the publication request message by the requester, and the digital signature can be validated to ensure that only trusted entities, i.e. only entities with verifiable identities, can publish messages that are handled by the asynchronous message processing system; the policy would state whether or not a signature is required.

The process continues by obtaining the identity of the publication requester (step 504), possibly along with any attributes that are associated with the requester if necessary; in other words, various information about the requester, including its identity, may be used for any subsequent processing. The publication request message indicates a particular event type for the event which the requester desires to publish; this indication is used to obtain an event policy for the event type (step 506), which was previously configured using a process such as the one described with respect to FIG. 3. An authorization operation is then performed (or requested from an authorization server/subsystem/system) for the publication request using the event policy based on the requester's identity and/or other information associated with the requester (step 508) in order to determine whether the requester is authorized to publish as requested. If the authorization process fails, then a response message that indicates the failure may be returned to the requesting entity.

Assuming that the requester has passed the authorization check, then the requester is allowed to become a publisher of the event with the requested event type. The requester's privacy policy is obtained (step 510), which may have been received along with the publication request or may be retrieved from an appropriate database.

The indication of the event type within the publication request is also used to obtain a list of identifiers of subscribers to events for the event type (step 512); each of these subscribers would have previously completed a subscription process such as the one described with respect to FIG. 4. The remainder of the figure then loops through the list to determine which subscribers should receive a publication event message that informs a subscriber about the occurrence of an event.

The initial subscriber in the list is retrieved (step 514); if step 514 is being repeated, then the process iteratively proceeds through the list, and each newly retrieved subscriber becomes the subscriber that is currently being processed, i.e. the "current" subscriber for the current loop iteration. An identifier for the current subscriber is used to obtain the privacy policy that is associated with the current subscriber (step 516).

The privacy policy of the publisher is then evaluated against the privacy policy of the current subscriber (step 518). The methods that are used to match, compare, evaluate, or otherwise correlate the privacy policies of the publisher and the subscriber may vary with the implementation of the present invention without affecting the scope of the present invention; these methods may be performed in accordance with the type of privacy policy and the format of the policy restrictions within the privacy policies. For example, the type of privacy policy that is used may indicate levels of privacy, and a subscriber might be allowed to receive a notification of an event only if the subscriber's privacy policy indicates a level of privacy that meets or exceeds the privacy level that is indicated within the publisher's privacy policy.

A determination is then made as to whether or not the privacy policies are compatible in some manner (step 520). If so, then a publication event message is generated, sent, or otherwise routed to the current subscriber (step 522). If the privacy policies are incompatible in some manner, then the process skips step 522. In any case, a determination is then made as to whether there is an additional subscriber in the list of subscribers that have not yet been processed (step 524); if so, the process loops back to step 514 to process another subscriber. If there are no additional subscribers, then the process is complete.

The advantages of the present invention should be apparent in view of the detailed description that is provided above. When a web service performs operations to complete a transaction on behalf of a user, the web service may need to interact with other web services, and during this interaction, the web services may need to exchange personally identifiable information that is associated with the user. However, the user may have provided the personally identifiable information to a web service with an understanding that the web service would handle the user's personally identifiable information in accordance with the web service's publicly available privacy policy.

In the present invention, control over the confidentiality of personally identifiable information is maintained by applying privacy policies within an asynchronous event-based message routing infrastructure that is used by a set of web services to exchange information, including any personally identifiable information for their users. By ensuring that any web services that publish and subscribe messages through the message routing infrastructure adhere to privacy policies, the system as a whole ensures that any personally identifiable information that is passed through those messages will be processed in accordance with those privacy policies.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing privacy constraints on transfers of information between data processing systems, the method comprising:
   receiving publication messages and subscription messages for event types;
   routing event messages between data processing systems based on privacy policies associated with the data processing systems and based on event policies associated with event types;
   receiving a publication request message from a first system;
   determining an event type associated with the publication request message;
   obtaining a first privacy policy associated with the first system;
   obtaining a second privacy policy associated with a second system that has previously subscribed to events of the event type;
   comparing the first privacy policy and the second privacy policy to determine compatibility or incompatibility between the first privacy policy and the second privacy policy; and
   sending a publication event message to the second system in response to a determination of compatibility between the first privacy policy and the second privacy policy.

2. The method of claim 1 further comprising:
   in response to determining the event type associated with the publication request message, obtaining an event policy associated with the event type; and
   determining whether the first system is authorized to publish events of the event type based on the event policy associated with the event type.

3. The method of claim 1 further comprising:
   in response to determining the event type associated with the publication request message, determining whether conditional or unconditional subscription rights are associated with the event type.

4. The method of claim 3 further comprising:
   in response to a determination that unconditional subscription rights are associated with the event type, sending a publication event message to systems that have previously subscribed to events of the event type without a comparison of privacy policies.

5. The method of claim 3 further comprising:
   in response to a determination that conditional subscription rights are associated with the event type, performing a comparison of privacy policies.

6. The method of claim 1 further comprising:
   determining conditional or unconditional subscription rights for the event type based on whether event messages for the event type contain personally identifiable information associated with users of the data processing systems.

7. The method of claim 1 further comprising:
   receiving a subscription request message from the second system;
   determining a second event type associated with the subscription request message;
   obtaining a second event policy associated with the second event type; and
   determining whether the second system is authorized to subscribe to events of the second event type based on the second event policy associated with the second event type.

8. The method of claim 1 wherein the event messages are formatted in accordance with SOAP (Standard Object Access Protocol) specifications.

9. The method of claim 1 wherein the privacy policies are formatted in accordance with P3P (Platform for Privacy Preferences) specifications.

10. An apparatus for managing privacy constraints on transfers of information between data processing systems, the apparatus comprising:
    means for receiving publication messages and subscription messages for event types;
    means for routing event messages between data processing systems based on privacy policies associated with the data processing systems and based on event policies associated with event types;
    means for receiving a publication request message from a first system;
    means for determining an event type associated with the publication request message;
    means for obtaining a first privacy policy associated with the first system;
    means for obtaining a second privacy policy associated with a second system that has previously subscribed to events of the event type;
    means for comparing the first privacy policy and the second privacy policy to determine compatibility or incompatibility between the first privacy policy and the second privacy policy; and
    means for sending a publication event message to the second system in response to a determination of compatibility between the first privacy policy and the second privacy policy.

11. The apparatus of claim 10 further comprising:
    means for obtaining an event policy associated with the event type in response to determining the event type associated with the publication request message; and
    means for determining whether the first system is authorized to publish events of the event type based on the event policy associated with the event type.

12. The apparatus of claim 10 further comprising:
    means for determining whether conditional or unconditional subscription rights are associated with the event type in response to determining the event type associated with the publication request message.

13. The apparatus of claim 12 further comprising:
    means for sending a publication event message to systems that have previously subscribed to events of the event type without a comparison of privacy policies in response to a determination that unconditional subscription rights are associated with the event type.

14. The apparatus of claim 12 further comprising:
    means for performing a comparison of privacy policies in response to a determination that conditional subscription rights are associated with the event type.

15. The apparatus of claim 10 further comprising:
means for determining conditional or unconditional subscription rights for the event type based on whether event messages for the event type contain personally identifiable information associated with users of the data processing systems.

16. The apparatus of claim 10 further comprising:
means for receiving a subscription request message from the second system;
means for determining a second event type associated with the subscription request message;
means for obtaining a second event policy associated with the second event type; and
means for determining whether the second system is authorized to subscribe to events of the second event type based on the second event policy associated with the second event type.

17. The apparatus of claim 10 wherein the event messages are formatted in accordance with SOAP (Standard Object Access Protocol) specifications.

18. The apparatus of claim 10 wherein the privacy policies are formatted in accordance with P3P (Platform for Privacy Preferences) specifications.

19. A computer program product in a computer readable medium for use in managing privacy constraints on transfers of information between data processing systems, the computer program product comprising:
means for receiving publication messages and subscription messages for event types;
means for routing event messages between data processing systems based on privacy policies associated with the data processing systems and based on event policies associated with event types;
means for receiving a publication request message from a first system;
means for determining an event type associated with the publication request message;
means for obtaining a first privacy policy associated with the first system;
means for obtaining a second privacy policy associated with a second system that has previously subscribed to events of the event type;
means for comparing the first privacy policy and the second privacy policy to determine compatibility or incompatibility between the first privacy policy and the second privacy policy; and
means for sending a publication event message to the second system in response to a determination of compatibility between the first privacy policy and the second privacy policy.

20. The computer program product of claim 19 further comprising:
means for obtaining an event policy associated with the event type in response to determining the event type associated with the publication request message; and
means for determining whether the first system is authorized to publish events of the event type based on the event policy associated with the event type.

21. The computer program product of claim 19 further comprising:
means for determining whether conditional or unconditional subscription rights are associated with the event type in response to determining the event type associated with the publication request message.

22. The computer program product of claim 21 further comprising:
means for sending a publication event message to systems that have previously subscribed to events of the event type without a comparison of privacy policies in response to a determination that unconditional subscription rights are associated with the event type.

23. The computer program product of claim 21 further comprising:
means for performing a comparison of privacy policies in response to a determination that conditional subscription rights are associated with the event type.

24. The computer program product of claim 19 further comprising:
means for determining conditional or unconditional subscription rights for the event type based on whether event messages for the event type contain personally identifiable information associated with users of the data processing systems.

25. The computer program product of claim 19 further comprising:
means for receiving a subscription request message from the second system;
means for determining a second event type associated with the subscription request message;
means for obtaining a second event policy associated with the second event type; and
means for determining whether the second system is authorized to subscribe to events of the second event type based on the second event policy associated with the second event type.

26. The computer program product of claim 19 wherein the event messages are formatted in accordance with SOAP (Standard Object Access Protocol) specifications.

27. The computer program product of claim 19 wherein the privacy policies are formatted in accordance with P3P (Platform for Privacy Preferences) specifications.

* * * * *